United States Patent [19]

Yoshio

[11] Patent Number: 4,691,266
[45] Date of Patent: Sep. 1, 1987

[54] ELECTRIC DOUBLELAYER CAPACITOR

[75] Inventor: Arakawa Yoshio, Nagaokakyo, Japan

[73] Assignee: Murata Manufacturing Co., Ltd., Kyoto, Japan

[21] Appl. No.: 842,841

[22] Filed: Mar. 24, 1986

[30] Foreign Application Priority Data

Mar. 26, 1985 [JP] Japan .............................. 60-44640[U]

[51] Int. Cl.$^4$ .............................................. H01G 9/00
[52] U.S. Cl. ..................................................... 361/433
[58] Field of Search ............ 361/433 C, 433 S, 433 L, 361/328, 329, 330, 306, 307, 308, 433 A

[56] References Cited

U.S. PATENT DOCUMENTS

| | | | |
|---|---|---|---|
| 3,275,902 | 9/1966 | McHugh et al. | 361/433 |
| 3,513,369 | 5/1970 | England et al. | 361/308 |
| 3,849,708 | 11/1974 | Leighton | 361/308 |
| 4,394,713 | 7/1983 | Yoshida | 361/433 |
| 4,414,607 | 11/1983 | Sekido et al. | 361/433 C |

FOREIGN PATENT DOCUMENTS 2903093  7/1980  Fed. Rep. of Germany ... 361/433 S

Primary Examiner—Donald A. Griffin
Attorney, Agent, or Firm—Wenderoth, Lind & Ponack

[57] ABSTRACT

This invention concerns an electric doublelayer capacitor composed essentially of one or more than one cells piled up one after another, a plus terminal plate with a plus terminal rod put beneath the lowermost cell, an insulating plate, a minus terminal plate with a minus terminal rod put beneath the insulating plate, an insulating tube surrounding the cells and a casing covering the top, side and lowermost periphery of all the above united components, which is made of a shrinkable electroconductive resin film. The film, electrically connecting the upper surface electrode of the uppermost cell to the minus terminal plate, is used to seal up all the united components air-tight by making use of its heat-shrinkability; therefore, the sealedness of the capacitor and the contactness of individual cells are improved very much, compared with conventional double-capacitor of this type employing metal casing, which naturally results in the increase of water- and solvent-proofness.

3 Claims, 2 Drawing Figures

ELECTRIC DOUBLELAYER CAPACITOR

This invention relates to an electric doublelayer capacitor to be incorporated in various types of electronic circuits.

FIG. 2 shows the structure of a conventional electric doublelayer capacitor. As seen from the figure, according to requirements, one or more than one cells 2, covered with an insulating tube 3, are put in a cylindrical metal casing 1. Meanwhile, when a plurality of cells 3 are required, the insulating tube 2, for which usually heat-shrinkable material is used, serves to seal them up upon being shrunk at a temperature not so high as to damage them.

Attached to the open end of the metal casing 1 are plus 4 and minus 5 terminal plates with an insulating plate 8 put between them. A plus terminal rod 6 of the plus terminal plate 4 projects downwardly passing through a projecting portion 10 provided to the under surface of the insulating plate 8. The projecting portion 10 of the insulating plate 8 engages with a hole of the minus terminal plate 5, while a downwardly projecting minus terminal rod 7 is provided to the under surface of the minus terminal plate 5. The open end 9 of the metal casing 1 is bent and caulked inwardly so that the minus terminal plate 5 is fastened with it. The upper side electrode of the uppermost cell 2 and the minus terminal plate 5 are electrically connected to each other by means of the metal casing 1.

As stated above, in the manufacturing process of conventional electric doublelayer capacitors, the lower end 9 of the metal casing 1 has to be caulked inwardly to fasten the minus terminal plate 5. On account of this, a large pressing machine and an expensive caulking die are needed, which results in the increase of the production cost. Moreover, the quality of products varies with fluctuation in caulking strength. Furthermore, being not completely sealed, the products are inferior in water- and chemical-proofness.

Accordingly, it is an object of this invention to provide an electric doublelayer capacitor for which production does not need such a large pressing machine and an expensive caulking die so that the production cost can be reduced greatly. It is another object of this invention to provide an electric doublelayer capacitor of which individual cells are compressed in one with uniform strength so as to increase the evenness of the product quality. It is still another object of this invention to provide an electric doublelayer capacitor superior in water- and chemical-proofness by the achievement of complete sealing. The above and other objects and features of the invention will appear more fully hereinafter from a consideration of the following description taken in connection with the accompanying drawing wherein one embodiment is illustrated by way of example.

Figure 1:
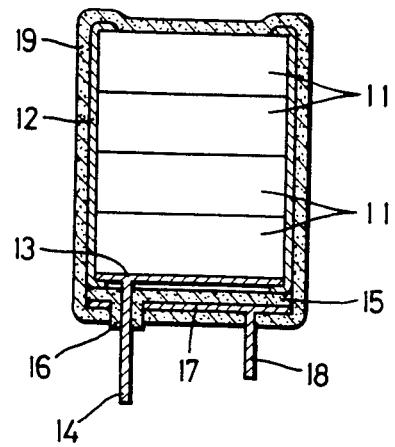
FIG. 1 is a longitudinal sectional elevation of an electric doublelayer capacitor according to this invention.
Figure 2:
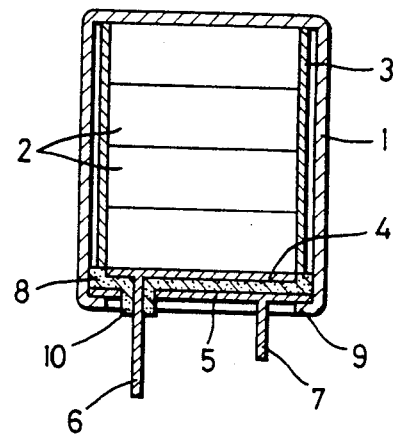
FIG. 2 is a longitudinal sectional elevation of a conventional electric doublelayer capacitor.

In FIG. 1, which shows an example of this invention, cells 11 are covered with an insulating tube 12. Like this, when a plurality of cells 11 are used for the capacitor, the insulating tube also plays a role of uniting them together. For this purpose, the insulating tube 12 is made from a heat-shrinkable synthetic resin and caused to shrink at a temperature not so high as to affect the cells 11. A plus terminal plate 13 is abutted to the bottom of the lowermost cell and then the tube is caused to shrink by heat with its lower end put a little lower than the terminal plate 13. Thus, the cells 11 and the terminal plate 13 become united.

The under surface of the terminal plate 13 is provided with a plus terminal rod 14 projecting downwardly. Laid under the terminal plate 13 is an insulating plate 15 made of a synthetic resin which is provided with a projecting portion 16 whose center is bored through so that the plus terminal rod 14 can pass through it. Laid under the insulating plate 15 is a minus terminal plate 17 which has a hole to let the projecting portion 16 of the insulating plate 15 pass through and a minus terminal rod 18 projecting downwardly. The structure prevents the terminal plates 13 and 17 from electrically connecting with each other.

A film 19 covers the insulating tube 12 outside the cells 11, the periphery of the under surface of the terminal plate 17 and the upper surface of the uppermost cell 11. A shrinkable, electroconductive resin is used for the film 19. Actually, a molten, liquified electroconductive resin is put on the insulating tube 12, part of the under surface of the terminal plate 17 and the upper surface of the uppermost cell by by the overcoating, casting or molding method and then allowed to shrink. As a matter of course, the heating temperature of the resin must not be so high as to cause damage to the cells 11.

As seen from the structure of this capacitor, the electroconductive resin film is in close contact with the upper surface of the uppermost cell 11 and the minus terminal plate 17 at the bottom. The under surface electrode of the lowermost cell 11 is in close contact with the plus terminal plate 13, but insulated from the minus terminal plate 17 by means of the insulating plate 15.

As stated above, the doublelayer capacitor of this invention is covered with a hardening electroconductive resin film in place of conventional metal casting, so that the inside cells are completely isolated from the atmosphere. The capacitor, covered with an electroconductive resin casing, thus does not need a large pressing machine and an expensive caulking die as in the case of a conventional capacitor of this type used to do in where it was necessary to make its casing with metal, with the result that it is great advantage for this invention to cut down on the production cost greatly. Additionally, because of making use of the shrinkability of an electroconductive resin to unite cells, the characteristics of the capacitor becomes stabilized by their increased contactness. Addtionallly, being completely sealed, the capacitor is superior in water- and solvent-proofness.

I claim:

1. An electric doublelayer capacitor comprising a cell, a plus terminal plate with a plus terminal rod fixed beneath the cell, an insulating plate, a minus terminal plate with a minus terminal rod fixed beneath the insulating plate, an insulating tube surrounding the cell and a casing covering the top, side and bottom periphery of all said components, characterized in that a shrinkable electroconductive resin film is used as said casing.

2. An electric doublelayer capacitor as claimed in claim 1, characterized in that said cell is composed of a plurality of cells and the top, side and bottom periphery of all said components including said cells are covered with said shinkable electroconductive resin film so as to unite the elements.

3. An electric doublelayer capacitor as claimed in claim 1, characterized in that said electroconductive resin film is shrunk and hardened by heat in order to tightly seal said cell.

* * * * *